(12) United States Patent
Chamberlain et al.

(10) Patent No.: US 6,408,360 B1
(45) Date of Patent: Jun. 18, 2002

(54) CACHE OVERRIDE CONTROL IN AN APPARATUS FOR CACHING DYNAMIC CONTENT

(75) Inventors: John T. Chamberlain, Medford; Edward M. Batchelder, Brookline; Andrew J. Warton, Arlington; Charles E. Dumont, Pepperell, all of MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/236,723

(22) Filed: Jan. 25, 1999

(51) Int. Cl.[7] .............................................. G06F 12/00
(52) U.S. Cl. ...................................... 711/124; 711/118
(58) Field of Search ........................ 711/141, 118–124

(56) References Cited

U.S. PATENT DOCUMENTS 5,787,470 A * 7/1998 DeSimone et al. ......... 711/124
5,933,849 A * 8/1999 Srbljic et al. ............... 711/118
6,032,182 A * 2/2000 Mullen-Schultz ........... 709/223

* cited by examiner

Primary Examiner—Do Hyun Yoo
Assistant Examiner—Nasser Moazzami
(74) Attorney, Agent, or Firm—Mintz Levin Cohn Ferris Glovsky and Popeo, P.C.

(57) ABSTRACT

A caching system and method are disclosed that allow for the caching of web pages that have dynamic content. The caching system and method utilize a cacheability analyzer that analyzes responses based on time, content, user identification, and macro hierarchy. The caching system only caches those responses having dynamic content that are deemed cacheable. Further, the automatic caching system can be overridden by the information author, the page creator or the system designer.

29 Claims, 10 Drawing Sheets

CACHE OVERRIDE CONTROL IN AN APPARATUS FOR CACHING DYNAMIC CONTENT

COPENDING APPLICATIONS

This application is a application filed on an even date herewith and assigned U.S. patent application Ser. No. 09/237,135, entitled "METHOD AND SYSTEM FOR AUTOMATICALLY CACHING DYNAMIC CONTENT". The subject matter of the above-identified co-pending patent application is incorporated herein by reference.

FIELD OF THE INVENTION

The present invention relates generally to data caching of web content on a has network and, more specifically, to a system for overriding the automatic caching of dynamic content in web pages in a web server.

BACKGROUND OF THE INVENTION

The Internet and the World Wide Web (WWW) provide intra-enterprise connectivity, inter-enterprise connectivity and application hosting on a larger scale than ever before. By exploiting the broadly available and deployed standards of the Internet and the WWW, system users and designers can leverage a single architecture to build client/server applications for internal use that can reach outside to customers, business partners and suppliers.

FIG. 1 shows a commonly used network arrangement in which a plurality of local computer systems 200 in a local area network (LAN) may access a plurality of remote servers 100 through the Internet. Each remote server may be a web server (such as a Domino™ web server, available from Lotus Development Corporation of Cambridge, Mass.) for providing a web site for access by local computer systems 200. Each web site normally further provides a plurality of web pages to be served to the local computer systems upon request. Each local computer system may access the remote web sites with web browser software.

The WWW is a collection of servers on an IP (Internet Protocol) network, such as the Internet, an Intranet or an Extranet, that utilize the Hypertext Transfer Protocol (HTTP). Hereinafter, "Internet" will be used to refer to any IP network. HTTP is a known application protocol that provides users with access to files, which can be in different formats, such as text, graphics, images, sound, and video, using a standard page description language known as Hypertext Markup Language (HTML). Among a number of basic document formatting functions, HTML allows software developers to specify graphical pointers on displayed web pages, commonly referred to as "hyperlinks," that point to other web pages resident on remote servers. Hyperlinks commonly are displayed as highlighted text or other graphical image on the web page. Selection of a hyperlink with a pointing device, such as a computer mouse, causes the local computer to download the HTML associated with the web page from a remote server. The browser then renders the HTML into the displayed web page.

Web pages accessed over the Internet, whether by a hyperlink, opening directly via an "open" button in the browser, or some other means, are commonly downloaded into the volatile cache of a local computer system. In a computer system, for example, the volatile cache is a high-speed buffer that temporarily stores web pages from accessed remote web sites. The volatile cache thus enables a user to quickly review web pages that were already downloaded, thereby eliminating the need to repeat the relatively slow process of traversing the Internet to access previously viewed web pages. This is called local caching.

On the server side, the first web servers were merely HTTP servers that resolved universal resource locators (URLs) by extracting literally from the URL the path to a file that contained the needed page, and transmitting the page back to the browser. Such a server was very simple; it could only be used to access static pages.

A "static" page is a page which, each time it is requested and served to a requester, has the same byte content. That is, it does not depend upon which requester is requesting the page, when the requester is requesting the page, etc., the byte content of that page remains the same. By contrast, a "dynamic page" is a page which has byte content that may very well change depending upon the particular requestor, when the page is being requested, etc. This will be discussed further below. It is important that web pages be served as quickly as possible, both to reduce the response time to a single user, and to increase the number of users that can be served concurrently. To improve the response time, the Web server uses caches. Web server caches are used to store web page responses in a readily accessible memory location so that when the web page is requested by a user, a previously cached web page response can be retrieved from cache and served quickly to the user.

Caching web page responses by the web server works quite well for web page responses having static content, i.e., content that doesn't change frequently. An example of a static web page is one, at a company's web site, comprising a compilation of text and graphics objects describing that company's history.

In fact, classic web servers cache static pages quite effectively. Specifically, classic web servers serve web page responses, some of which are static, namely, responses comprising HTML from the file system. Each of the static responses has a last modified date associated with it that is maintained by the file system. The contents of the response and its associated last modified date are simply stored in the cache for possible future use by the web server. When a subsequent request is received by the server for that page, the server requests the latest modification date for that page from the file system and compares the latest modification date with the last modified date associated with the candidate cached response. If the latest modification date is the same as the last modified date associated with the candidate cached response, the candidate cached response is considered to be "fresh" and is served to the request (i.e., to the requesting user). If the latest modification date is later than the last modified date associated with the candidate cached response, the candidate cached response is considered "stale" and a "fresh" response is retrieved and built by the web server for serving to the requesting user. The fresh response, along with its associated last modified date, is cached to replace the stale response. This caching scheme saves the time and server processor cycles that otherwise would have been spent to build requested pages which otherwise could have been cached using this classic caching scheme.

However, newer web servers provide not only static web pages but also dynamic web pages, i.e., a page having byte content that may very well change depending upon the particular requester, when the page is being requested, etc. Examples of dynamic web pages are pages containing content from a number of different sources or pages having computed content. For example, a page may contain macros that compute content for the page, i.e., the page has "computable content". These macros may change the page content each time the page is accessed. This makes it difficult to cache that page using the classic caching method described above. (Macros, or formulas as they are named in Lotus Notes software, are expressions that perform a function, such as determining field values, defining which documents appear in a view, or calculating values for a column. Lotus Notes is available from Lotus Development Corporation in Cambridge, Mass.)

Alternatively, the page may contain information from a number of different sources, and that information may or may not have associated last modified dates making it difficult, if not impossible, to cache using the classic caching method. For example, the page may comprise a composite of a number of "parts" including: other documents, designs from databases, content from databases, the present user's identity, the current time, the current environment, etc. Some of these parts are actual entities in the system, e.g., documents, databases, etc. Some parts though are "virtual" and are used to model the effects of the execution of macros or scripts, e.g., the user's identity may be accessed via one of a number of @functions such as @UserName, @UserRoles, etc., in Lotus Notes software. ("@functions" are macros for performing specialized tasks in Lotus Notes formulas. They can be used to format text strings, generate dates and times, format dates and times, evaluate conditional statements, calculate numeric values, calculate values in a list, convert text to numbers or numbers to text, or activate agents, actions, buttons, or hotspots.) These various part types are computable parts and have correspondingly various types of attributes that can not be handled by the classic caching systems and methods of prior art.

Clearly, it is more difficult to use caching as a mechanism for improving user response time for pages with dynamic content. This problem for the server is twofold. First, after building a web page response, the server must determine whether the response that it is preparing to serve the requesting user is cacheable (i.e., determining its cacheability). Second, the server, upon receiving a request for a web page whose previous response has been cached, must determine whether the cached response is valid (i.e., determining its validity) and applicable (i.e., determining its applicability). For instance, web page responses containing macros that are time-dependent may not be cacheable at all. If a page includes a macro for providing the current time, then every access of the page is unique and the page cannot be cached in memory at all. Another example is where is a cached page is valid for serving to some users but not others. For instance, if the page includes a macro for the user's name, then the page can be cached for serving to that particular user, but not for serving to others. (HTML representing a document is specific to a user if macros are dependent on user name or user roles. Using this user data, some data may be made visible based on which user is requesting it.)

The term "Dynamic HTML" (DHTML) needs to be explained in the context of the method and system of the present invention. "Dynamic" as used in DHTML is referring primarily to the effect that the code has on the web page appearance at the browser. For instance, the dynamic HTML may comprise scripts that run on the browser to change the appearance of the web page such as by displaying a button that, if pushed, displays additional text or graphics. The key distinction is that "dynamic" in the DHTML sense refers to the browser, not the server. From the server's point of view, a DHTML page may still be "static" in that the byte content may be the same each time the page is requested, so for the purposes of this invention, a DHTML page may be "static" or "dynamic" in the sense of the invention. The content is not dependent on any thing, e.g., the properties of the request, such as the identity of the particular user, the time of day that the request is made, etc. "Dynamic" content, as used in the system and method of the present invention, refers to content that has such dependencies. Thus, "dynamic" in the DHTML sense is not related to "dynamic" in the sense of the invention.

As can be readily seen, using caching as a means for increasing server performance for responses which have dynamic content has a number of complications and difficulties which have not been overcome by any of the systems of the prior art. As such, HTML representing responses having dynamic content has not been cached in the past. Accordingly, system and method to cache content that can include dynamic content without suffering from the drawbacks discussed above is needed.

SUMMARY OF THE INVENTION

According to the present invention, a caching system and method utilized within a web server is disclosed that automatically caches web content, such as a web page, that has dynamic content. The caching system and method of the present invention is utilized within a web server which receives requests for web pages and, based upon those requests, serves web page responses that were previously cached or, if those cached responses are either inapplicable or invalid, the server builds a new response and serves it to the requester. The caching system performs two critical functions: first, it determines the cacheability of built responses and caches those responses it deems cacheable and second, if a cached response appears appropriate for a particular web page request, the caching system examines the cached response to determine whether the cached response is applicable for the particular request and whether the cached response is still valid. Each response is comprised of a plurality of parts, some of the parts being dynamic in nature. The parts have associated attributes that, either explicitly or implicitly, characterize the nature of the parts. The caching system comprises an attribute analyzer that creates a composite set of attributes, the composite representing the characteristics of the response. The caching system further comprises a cacheability analyzer that analyzes the attribute composite set and determines the cacheability of the response. The server then caches the response based upon that determination. Examples of attributes utilized for determining cacheability include the time variance setting of the dynamic content, the user's identity, or the location of the content.

The caching system further comprises a cached-response analyzer for analyzing the cached responses prior to serving to a requesting user. The cached-response analyzer comprises an applicability analyzer (for determining the applicability of the cached response to the particular request) and a validity analyzer (for determining the validity of the cached response). If the cached response passes the tests performed by these analyzers it is served to the requesting user.

The caching system of the present invention further comprises a system for overriding the automatic analysis performed by the system. The override system can be set by the document creator, the page designer or the system designer.

The method steps may also be implemented in program code for modifying a computer system to cache information that has dynamic content.

BRIEF DESCRIPTION OF THE DRAWINGS

The foregoing and other objects and advantages of the invention will be appreciated more fully from the following further description thereof with reference to the accompanying drawings wherein.

DETAILED DESCRIPTION OF THE PREFERRED EMBODIMENT

Figure 1:
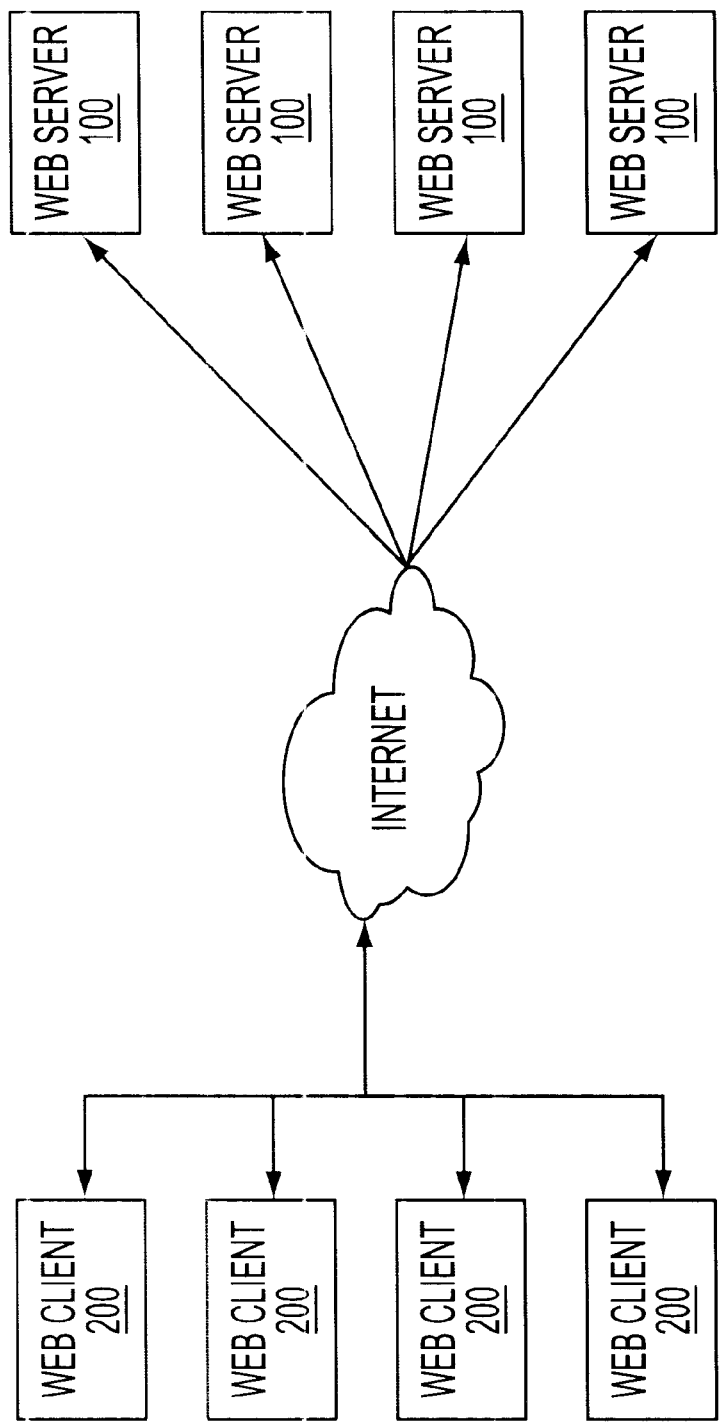
FIG. 1 is a block diagram of a generic network configuration that may be used with the disclosed system.
Figure 2:
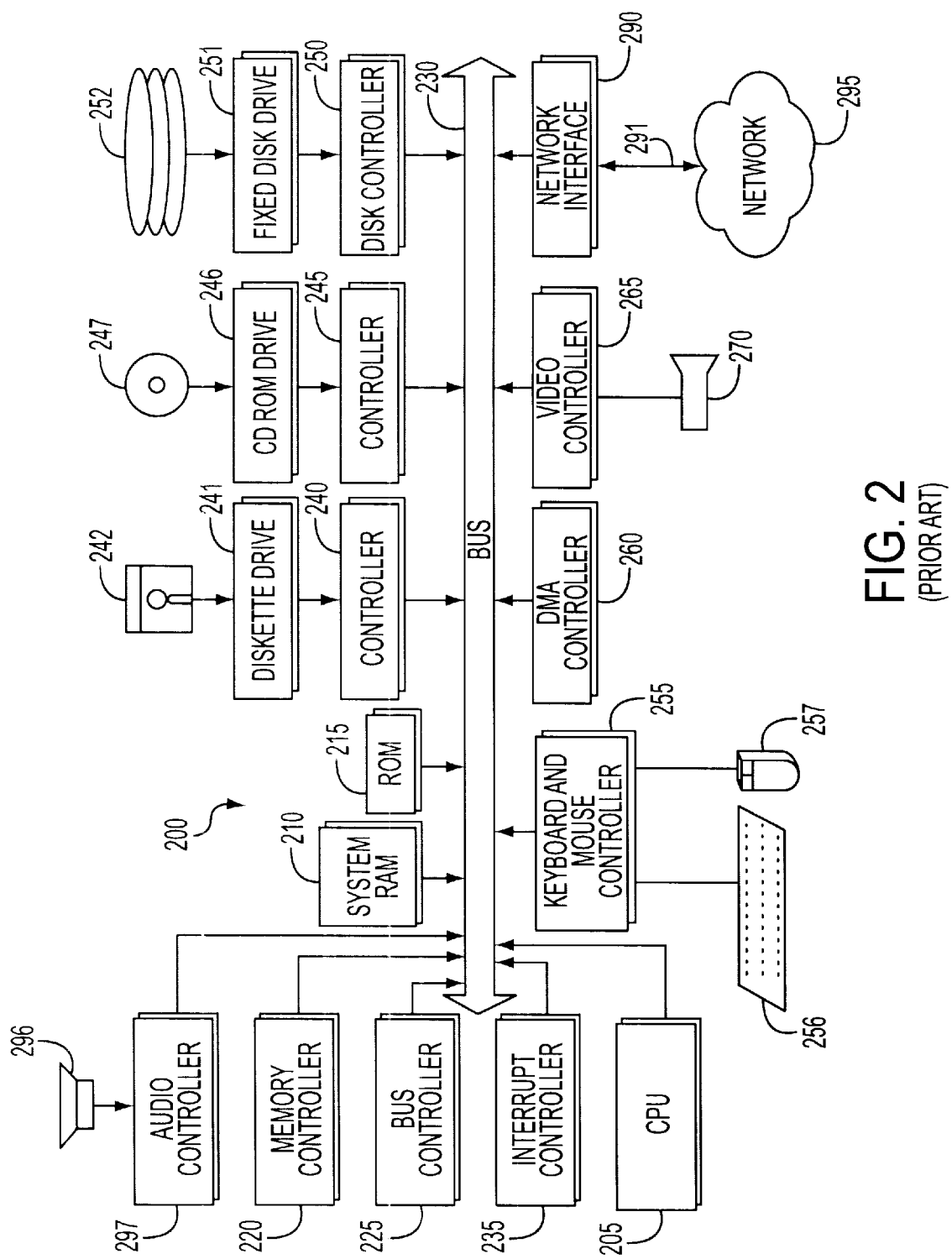
FIG. 2 is a block diagram of a web server system.

FIG. 2 illustrates the system architecture for an exemplary server 100 or client computer 200, such as an IBM THINK-PAD 701® computer or like computer, on which the disclosed network access system can be implemented. The exemplary computer system of FIG. 2 is discussed only for descriptive purposes, however, and should not be considered a limitation of the invention. Although the description below may refer to terms commonly used in describing particular computer systems, the described concepts apply equally to other computer systems, including systems having architectures that are dissimilar to that shown in FIG. 2.

The server 100 includes a central processing unit (CPU) 205, which may include a conventional microprocessor, random access memory (RAM) 210 for temporary storage of information, and read only memory (ROM) 215 for permanent storage of information. A memory controller 220 is provided for controlling system RAM 210. A bus controller 225 is provided for controlling bus 230, and an interrupt controller 235 is used for receiving and processing various interrupt signals from the other system components.

Diskette 242, CD-ROM 247, or hard disk 252 may provide mass storage. Data and software may be exchanged with server 100 via removable media, such as diskette 242 and CD-ROM 247. Diskette 242 is inserted into diskette drive 241, which is connected to bus 230 by controller 240. Similarly, CD-ROM 247 can be inserted into CD-ROM drive 246, which is connected to bus 230 by controller 245. CD-ROM 247 can also have digital versatile disc (DVD) playback capabilities as well. Finally, the hard disk 252 is part of a fixed disk drive 251, which is connected to bus 230 by controller 250.

User input to the server computer 100 may be provided by a number of devices. For example, a keyboard 256 and a mouse 257 may be connected to bus 230 by keyboard and mouse controller 255. An audio transducer 296, which may act as both a microphone and a speaker, is connected to bus 230 by audio controller 297. It should be obvious to those reasonably skilled in the art that other input devices, such as a pen and/or tablet and a microphone for voice input, may be connected to server computer 100 through bus 230 and an appropriate controller. DMA controller 260 is provided for performing direct memory access to system RAM 210. A visual display is generated by as a video controller 265. which controls video display 270.

Server computer 100 also includes a network adapter 290 that allows the server computer 100 to be interconnected to a network 295 via a bus 291. The network 295, which may be a local area network (LAN), a wide area network (WAN), or the Internet, may utilize general-purpose communication lines that interconnect a plurality of network devices.

The Web server 100 answers URL (Universal Resource Locator) requests by sending back pages of data encoded in HyperText Markup Language (HTML). It also handles URL requests and HTML forms that trigger executable programs according to the Common Gateway Interface (CGI) specification. The Web server 100 includes code that manages both inbound and outbound HTTP (HyperText Transfer Protocol) communications. In these respects, the Web server 100 performs like any other HTTP server, responding in the standard way to standard URL requests.

The preferred embodiment will be discussed primarily in terms of a Lotus Domino web server although the system and method of the present invention may be implemented in any web server.

Figure 3:
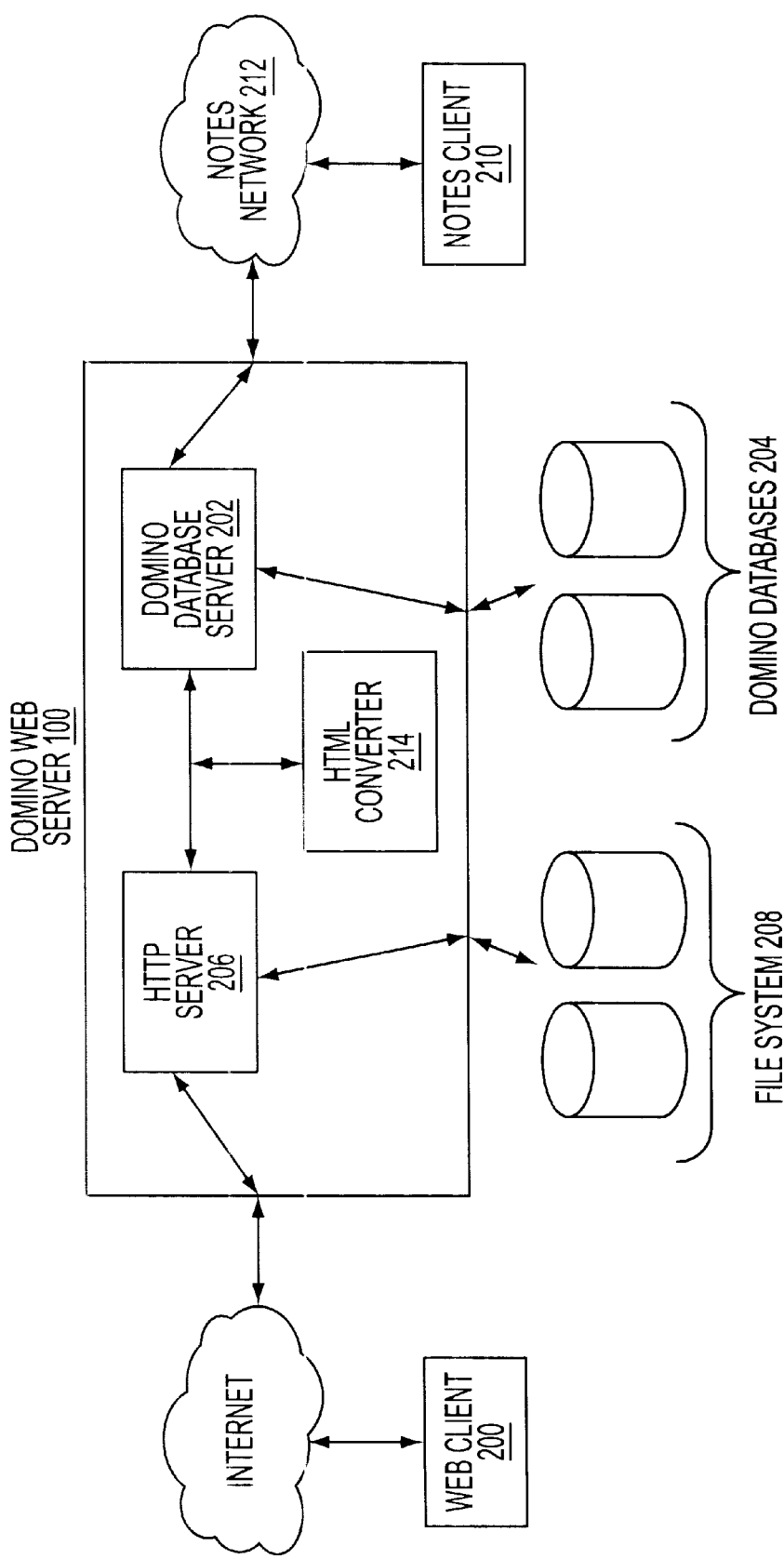
FIG. 3 is a high-level block diagram of a Lotus Domino web server.

As a matter of background, as can be seen in its most basic form in FIG. 3, a Domino web server 100 is a server having many tasks running on it simultaneously. Among the server tasks are the Domino™ database server tasks 202, i.e., serving up documents from Domino databases 204, and the HTTP server tasks 206, i.e., serving up documents having formats such as HTML, GIF, JPEG, XML, DHTML, BMP, MPEG, WAV, Java applets, and other file formats known to those skilled in the art from file system 208.

Notes software, available from Lotus Development Corporation, works with Domino to provide a distributed client/server database application to let users organize, process, track, and use information to suit their individual needs. Notes/Domino consolidate the tools needed to effectively communicate and collaborate in an organization by providing, inter alia, email, group discussion, workflow, scheduling, document management and many other functions. Domino databases are built on three basic concepts: documents, views and forms. Documents are collections of data items which can be retrieved as a set. Views are the ways of accessing the indices or summaries of documents stored in a database while forms are templates for accessing and displaying documents.

When a Notes client 210 requests access to a Domino database 204 via the Notes network 212, the Domino database server task 202 provides access. When a web client 200 requests an HTML document, the HTTP server task 206 provides it. When a web client 200 requests a Notes document, the HTTP server task 206 passes the request through to the Domino database server task 202. If access is granted, the Domino database server 202 retrieves the requested document and passes it to an HTML converter 214 which converts the Notes views, documents, and forms from Notes format to HTML format, then delivers the resulting HTML pages to the HTTP server 206 for serving to the web client. If a web client submits a form or query, the HTTP server task 206 passes the form to the HTML Converter 214 which converts the form to Notes format and passes it to the Domino database server 202 for appropriate processing.

Figure 4:
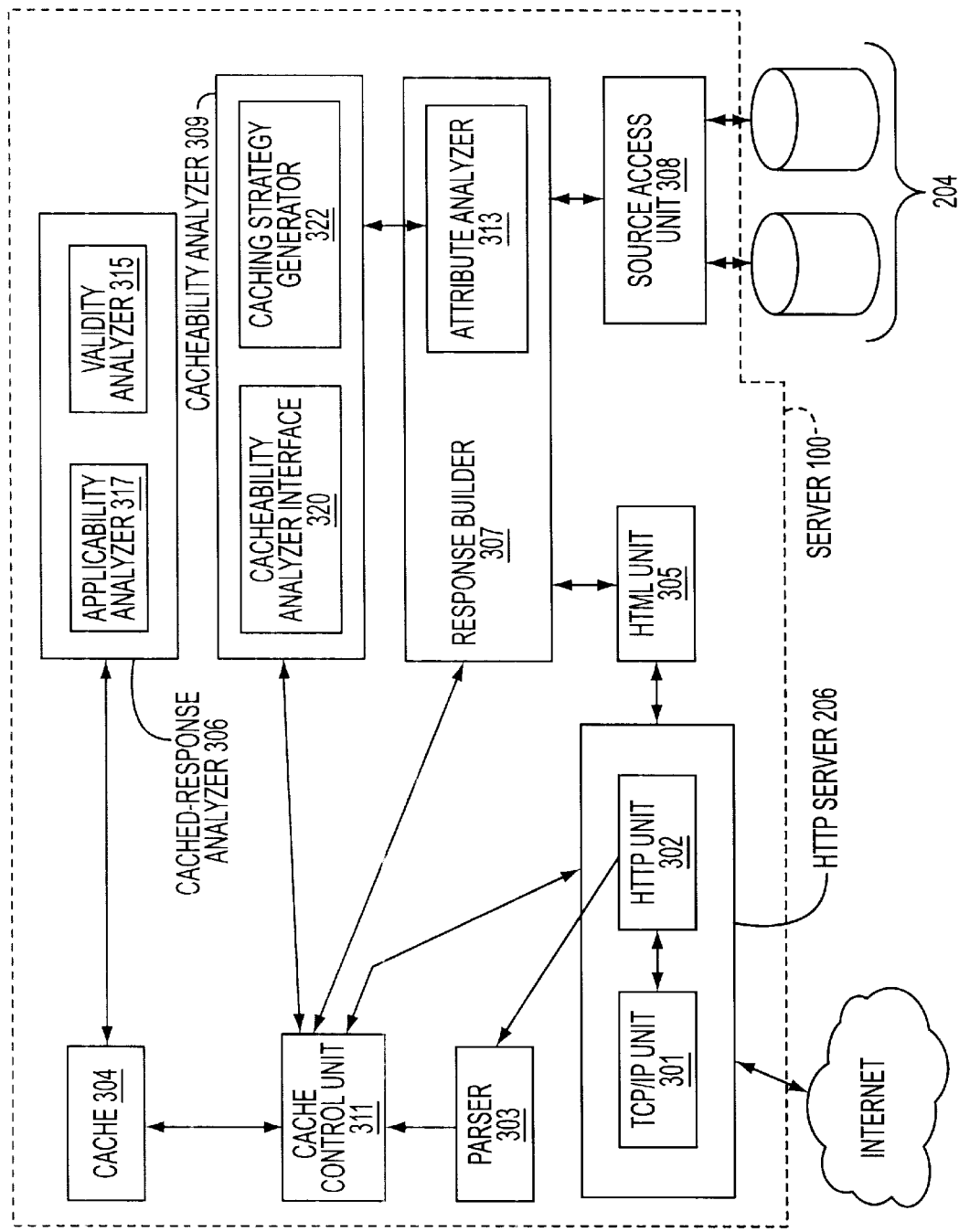
FIG. 4 is a block diagram of a web server system having the caching system of the present invention.

FIG. 4 illustrates the server caching system in greater detail. As shown in FIG. 4, the web server 100 may be connected to a number of Domino sources 204. However, the sources may comprise any number of different types of elements, other than Domino databases: other databases, files, other web sites, etc, but Domino sources are shown for clarity. The web server may also be connected to HTML databases 208 as was discussed above. The web server 100 comprises many functional units. It comprises the HTTP server 206, discussed above, which comprises a TCP/IP application 301, and a HyperText Transfer Protocol (HTTP) unit 302. The web server 100 further comprises the HTML converter unit 214 discussed above. It further comprises a parser 303 (for parsing received URLs), a cache 304, cache control unit 311, a cached-response analyzer 306, a response builder 307, a source access unit 308 (or Domino database server 202) and a cacheability analyzer 309.

These units operate as follows: TCP/IP unit 301 and HTTP unit 302 act together as the interface to the Internet by implementing the TCP/IP and HTTP protocols for server 100. TCP/IP unit 301 utilizes the TCP/IP protocol for conveying and receiving information to and from the Internet. HTTP unit 302 implements HTTP, which is the standard on which the Web operates. These two units provide the full-service interface to the Web.

When server 100 receives a URL from a client, the HTTP server 206 passes the URL to the URL Parser 303, which breaks the URL into different parts. The parsed URL is passed to the cache control unit 311. With a Domino server, within the URL that is received from the requesting user is a Domino/Notes-specific command, which indicates what action is being requested. The following are examples of server specific commands within the URL that may be received by the Domino server:

?OpenDatabase—command for opening a database;

?OpenView—command for opening a view;

?OpenDocument—command for opening a document;

?OpenForm—command for opening a form;

?ReadForm—command for reading a form; and

?EditDocument—command for editing a document.

While, in this example, each of these commands has a "?" in front of the command as syntax that the server can use to identify the string as a command, the server can identify other syntaxes as well. These commands require a response to be sent to the requesting user. The requested response may have already been cached and it may be valid and applicable. For those URLs having commands requesting a possibly-cached response (i.e., ?OpenDatabase, ?OpenView, ?OpenDocument, ?OpenForm, and ?ReadForm), the cache control 311 examines the request against previously cached responses to determine whether any of the previously cached responses is appropriate for the request. This is done by comparing the parsed URL against the URLs of the previously cached responses in the cache 304. If there is not an exact match or if the URL doesn't have "cacheable" commands (e.g., ?EditDocument), the parsed URL is passed to the response builder 307. The response builder 307 uses the parsed URL to build the response by accessing the appropriate sources (via source access unit 308) and retrieving the appropriate "parts" to construct the response. The parts retrieved by the response builder 307 may comprise many different types, including data, forms, subforms, database design elements, calculations, etc. In other words, there is no theoretical restriction as to the type of parts comprising a web page response. These parts each have their own attributes. For instance, some parts may or may not have last modified dates associated with the part. This will be discussed in greater detail below. The attributes of all of the parts used to build the response are collected and analyzed by attribute analyzer 313. The attribute analyzer 313 builds a "composite" of the attributes, the attribute composite being representative of the entire response.

Once the web page response is built by the response builder 307, it is passed to the HTML unit 305 for conversion to HTML. This HTML response is then passed to the HTTP server 206 for serving to the requesting user.

At the same time, the attribute analyzer 313 passes the composite of the parts' attributes to the cacheability analyzer 309 for determining the cacheability of the built response. The cacheability analyzer 309 examines the attribute composite and, if it determines that the response cannot be cached, the response is not cached. If it determines that the response can be cached, it provides an indication to the cache control unit 311, along with the response and an associated set of cache strategy indicators generated by the cacheability analyzer 309. These indicators are used by the cached-response analyzer as discussed below. The cacheability analyzer 309 comprises a cacheability analyzer interface 320 and a caching strategy generator 322. The cacheability analyzer interface 320 acts as an interface for the cacheability analyzer 309 while the caching strategy generator 322 examines the attribute composite and creates a caching strategy.

If the cache control unit determines that there is an exact match between the parsed URL of the user request and the URLs corresponding to one of the cached responses in the cache 304, the candidate cached response along with its associated cache strategy indicators is passed to the cached response analyzer 306. The response analyzer 306 performs two series of tests. The first series of tests are response-specific and the second series of tests are request-specific. The response-specific tests are performed by the validity analyzer portion 315 while the request-specific tests are performed by the applicability analyzer portion 317. These tests will be discussed in greater detail below. If the candidate cached response and its associated attributes pass the two tests, the candidate cached response is simply served up to the user via the HTTP server 206.

Determining how to make an accurate and timely decision as to which Web pages are cacheable is important in any caching system. Prior caching systems considered the presence of macros, among others, too volatile, and thus, did not consider any pages with macros, for example, as candidates for caching. Unfortunately, this meant that many Web pages could not take advantage of caching and the performance gains that it provides. The caching system of the present invention improves performance in the server 100 by providing the ability to cache Web pages that contain macros and other dynamic content.

As mentioned above, each of the parts that comprise a response has attributes, which provide information about that particular part. These attributes can provide information about the part's identity and last modification date, as examples. This type of information is valuable to the caching system of the present invention because it can be used to determine the cacheability, the applicability and the validity of the response or subsequently cached response. During the response building process of the response builder 307, the attribute analyzer 313 collects the attributes of the parts used in building the response. The attribute analyzer 313 creates a composite of the attributes of the parts of the response so that the response has a composite of attributes representative of the entire response. The attribute composite set is passed to the cacheability analyzer 309. The cacheability analyzer 309 uses this to determine a caching strategy. Specifically, the cacheability analyzer 309 examines the attribute composite and creates caching strategy flags which are used by the system for caching as will be discussed in greater detail.

As was noted above, each "part" of the response may have one or more attributes. If the part is an @function, the following list corresponds each @function with its associated attribute(s) that are set at compute time. The attribute Depends means that the evaluation of the @function will determine the attribute. If the @function says "Fallback", that means that there is an evaluation that is Web server-specific and this is the non-Web version. Its converse is "Web."

@Accessed—OffDatabase, UsedDocId
@Certificate—OffDatabase
@Command-Web—Depends
@Command([Compose])—Depends, DbDesign, OffDatabase
@Command([FileSave])—HadEffect
@Created—UsedDocId
@DbColumn-Fallback—UserVariant, DbDesign, DbData, Unknown. Depends, OffDatabase
@DbCommand-Fallback—Unknown
@DbCommand-Web—Depends
@DbLookup-Fallback—Depends, Unknown, DbData, DbDesign, UserVariant, OffDatabase
@DbManager—DbDesign
@DbTitle—DbDesign
@DocumentUniqueID—UsedDocId
@Environment—HadEffect, UsedEnvironment
@GetDocField—DbData, UserVariant
@GetPortsList—UsedEnvironment
@GetProfileField—DbData, UserVariant
@InheritedDocumentUniqueID—UsedDocId
@MailEncryptSavedPreference-Fallback—UsedEnvironment
@MailEncryptSentPreference-Fallback—UsedEnvironment
@MailSavePreference-Fallback—UsedEnvironment
@MailSend-Failback—HadEffect
@MailSignPreference-Fallback—UsedEnvironment
@Modified—UsedDocId
@NoteID—UsedDocId
@Now—TimeVariant
@PostedCommand-Web—Depends
@Random—OffDatabase
@Responses—DbData
@SetDocField—HadEffect, UserVariant
@SetProfileField—HadEffect, UserVariant
@TextToTime—TimeVariant
@Today—TimeVariant
@Tomorrow—TimeVariant
@Unique—None, Depends, OffDatabase
@URLGetHeader-Fallback—OffDatabase
@URLOpen-Fallback—OffDatabase, HadEffect
@UserAccess-Web—OffDatabase, UserVariant, DbDesign
@UserName—UserVariant
@UserPrivileges—DbDesign, UserVariant
@UserRoles-Fallback—DbDesign,UserVariant
@UserRoles-Web—DbDesign,UserVariant
@V3UserName—UserVariant
@ViewTitle—DbDesign
@Yesterday—TimeVariant
@Zone—TimeVariant The attribute composite used for characterizing the response for cacheability comprises the following attributes described below:

OffDb—The response uses data outside the current database. This includes the use of CGI variables.

TimeVariant (CacheUntil)—If the TimeVariant attribute bit is set, the response uses time-variant data (such as @Now which generates the current time and date). The CacheUntil parameter indicates the time/date after which the part is stale.

HadEffect—The response has an important side-effect (such as @SetDocField which modifies data in a Domino database).

UsedEnv—The response uses the server environment (as found in the NOTES.INI file). This does not include CGI variables.

UserVariant—The response is dependent on the user's identity. This includes using any data or design note that includes Read ACLs (Access Control Lists), Readers fields, Authors fields or controlled access sections.

DesignUserVariant—The response is from a database that has protected design elements.

DbData—The response uses data in the database other than the referenced document. This includes all views, embedded views in forms, and so on.

UsedDocId—The response uses the document's ID.

UsedNewDoc—The response uses a newly-created in-memory note.

Unknown—The response does something that couldn't be analyzed (such as executed in another programming language, such as LotusScript).

Error—The response generated an error of some sort.

This attribute composite is passed to the cacheability analyzer 309. It should be noted that this is the composite set of attributes for the response. The parts of the response contribute to this set by contributing to none, some or all of these attributes. The creation of the attribute composite set follows a conservative approach, i.e., if one part has an attribute indicating that the part cannot be cached, the composite will indicate that the response cannot be cached.

A number of caching strategy flags are generated by the cacheability analyzer 309 based upon the response attribute composite and are discussed below. It should be noted that this is a limited set of flags and other flags could be generated as well and the system of the present invention is not so limited. The flags are:

DontCache—Don't cache the response at all.

Document—Invalidate the cached response when the document changes.

DbDesign—Invalidate the cached response when the database design changes.

DbData—Invalidate the cached response when any of the data in the database changes.

OnlyAnonymous—Cache the response, but only serve it when the user is anonymous.

Figure 5A:
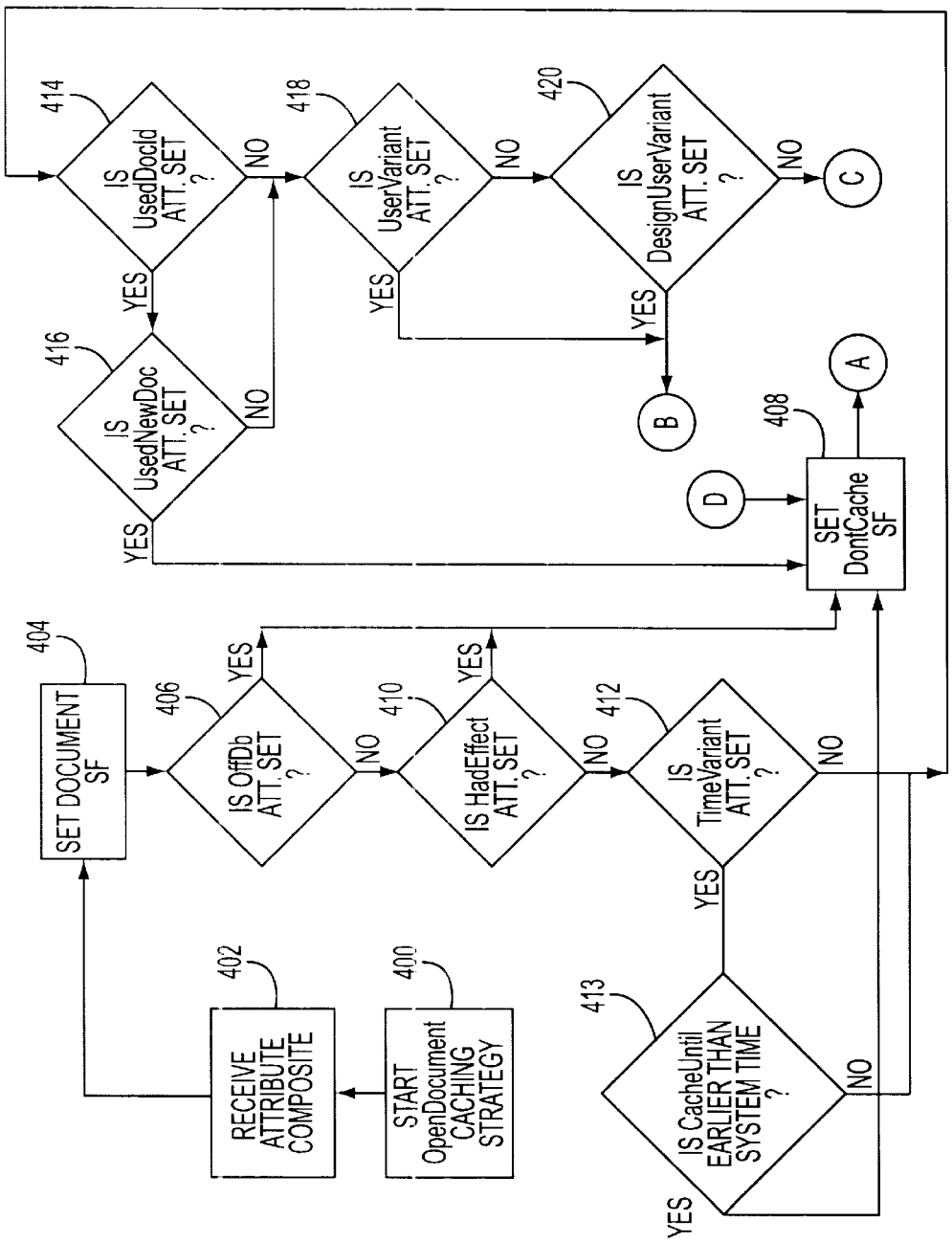
FIG. 5 (consisting of FIGS. 5a and 5b) is a flow chart of the method steps for determining the caching strategy when a document is being opened by a user.
Figure 5B:
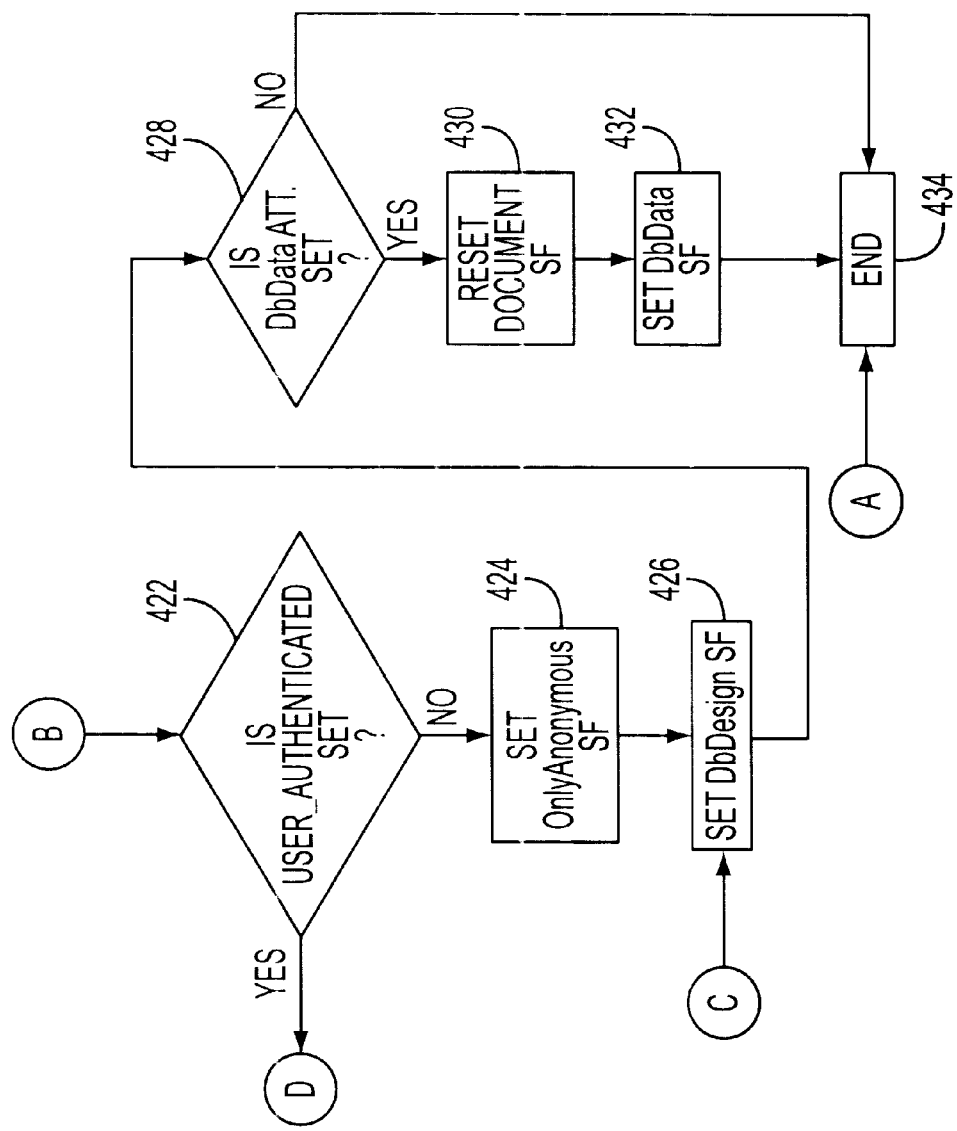

FIG. 5 (comprising FIGS. 5a and 5b) is a flow chart that illustrates the method used by the cacheability analyzer 309 to create the caching strategy flags associated with each of the built responses. This is the caching strategy used when the ?OpenDocument command is in the URL. Other caching strategies may be used when other commands are received from the user. At 400, the caching strategy procedure for an ?OpenDocument command begins. At 402, the attribute composite is received by the cacheability analyzer 309 (via cacheability analyzer interface 320 and is passed to caching strategy generator 322) from the attribute analyzer 313. At 404, in the caching strategy generator 322, the Document strategy flag is set. (For purposes of clarity, "to set" when used in conjunction with the state of a particular flag means to change it to "1", or positive state, while "to reset" means to change it to "0", or negative state.) At 406, the OffDb attribute is examined. If it is set, the DontCache strategy flag is set at 408. After the DontCache strategy flag is set at 408, the procedure goes to "A" shown on FIG. 5*b*. At "A", the procedure is finished at 434.) At 406, if the OffDb attribute is not set, the HadEffect attribute is examined at 410. If it is set, the DontCache strategy flag is set at 408 and the procedure continues to "A" as discussed above.) At 410, if the HadEffect attribute is not set, the TimeVariant attribute is examined at 412. If it is set, the CacheUntil parameter (which accompanies the TimeVariant attribute) is examined at 413. The CacheUntil parameter is in time/date units indicating the time/date after which the part (or response) is stale. This parameter is especially useful for the retrieval portion of this system to be discussed below. If the Cache-Until parameter is earlier than the then-present system time/date, the DontCache strategy flag is set at 408 and the procedure continues to "A" as discussed above. At 413, if the CacheUntil parameter is later than the then-present system time/date or, at 413, the TimeVariant attribute is not set, the UsedDocId attribute is examined at 414. If it is set, the UsedNewDoc attribute is examined at 416. If it is set (i.e., both the UsedDocId and UsedNewDoc attributes are set), the DontCache strategy flag is set at 408 and the procedure continues to "A" as discussed above. If either the UsedDocId or the UsedNewDoc attribute is not set, the UserVariant attribute is examined at 418. If it is not set, the DesignUserVariant attribute is examined at 420. If it is not set, the procedure continues at "C" to be discussed below. If either the UserVariant attribute at 418 or the DesignUser-Variant attribute at 420 is set, the procedure continues at "B" in FIG. 5*b*.

At "B" in FIG. 5*b*, the cacheability analyzer 309 determines whether the USER_AUTHENTICATED bit is set at 422. The USER_AUTHENTICATED bit, which is a property of the request that is determined during the initial processing of the request, indicates that the user was authenticated by the server. If the user was not authenticated and was still allowed to access the server data, the user is logged on as "Anonymous". There are many reasons why a server may be designed to authenticate a user. One reason may be that the authenticated user is allowed to access areas of the web site not accessible to non-authenticated users. Another may be that the authenticated user is allowed to enter information in databases where a non-authenticated user is not. In any event, the USER_AUTHENTICATED bit is passed to the cacheability analyzer 309 along with the attribute composite.

If USER_AUTHENTICATED bit is set, the DontCache strategy flag is set at 408 and the procedure continues to "A" as discussed above. If it is not set, the OnlyAnonymous strategy flag is set at 424. At 426 and at "C", the DbDesign strategy flag is set. At 428, the DbData attribute is examined. If it is not set, the procedure ends at 434. If it is set, the Document strategy flag is reset at 430. The DbData strategy flag is then set at 432. The procedure then ends at 434.

FIGS. 5*a* and 5*b* and corresponding discussion relates only to the cacheability strategy procedure when the request is an ?OpenDocument request. If the request includes another command instead, such as ?OpenView, the cacheability procedure may be different. However, this procedure is exemplary of cacheability procedures for other commands.

Another point is that the CacheUntil parameter was discussed only in terms of the TimeVariant attribute for an @function. The CacheUntil parameter could be used to characterize the part, irrespective if the part generated time/date data as the @functions having the TimeVariant attribute. It could be used to indicate a future time/date that the part was expected to change, after which the cached response having that part should be re-built.

The CacheUntil parameter can be a property of the part itself or, alternatively, may be set by the part creator as an override. An example of the former is the @Today function. At compute time, the CacheUntil parameter for the @Today function is set to the end of that particular day. For instance, if that day's calendar date is Jan. 15, 1999, the CacheUntil parameter is set to "Jan. 15, 1999, 23:59:59".

However, the creator of the part may know information about the part that is not determinable from an analysis of the part by the cacheability analyzer. For example, the part creator may know that the part is expected to change at the end of the calendar year. In that example, the part creator may override the automatic setting of the CacheUntil parameter (whatever that may be) by setting it to "12/31/99, 23:59:59". Prior to that point in time, the cached-response analyzer would perform its normal validity analysis. After that point, the cached-response analyzer would determine that the response is stale and a new response needs to be built.

The caching strategy flags that are generated by the caching strategy generator 322 are passed to the cacheability analyzer interface 320. The cacheability analyzer interface 320 examines the flags to determine whether the built response should be cached in cache 304. Concurrently, the built response is sent to the HTML unit 214 and to the HTTP server 206. The HTTP server 206 serves the built response in HTML format to the user (without the strategy flags). If the cacheability analyzer determines that the response should be cached, it sends the response in HTML format, along with the strategy flags and with some other parameters (such as last_modified _date, CacheUntil) etc.), to the cache 304 for caching. The response is also served back to the user.

After a response is cached, it remains in the cache until it is either removed or replaced. A cached response is normally replaced after it becomes known that one of the source parts has been modified at the source. This is sometimes known as the cached response becoming "stale". Normally, a cached response is identified as stale when its URL is requested by a user and the cache control unit compares the candidate cached response's last modified date against all of the source parts' last modified dates as discussed above.

A cached response may be removed for any number of reasons defined by the cache designer. Many times, the cache control unit 311 comprises a cache manager which utilizes a cache management utility for managing the cache. The cache manager may, for example, remove from cache those cached responses that have a predetermined life span which has expired (e.g., a response may have a CacheUntil parameter associated with it) or those cached responses that have least frequently been accessed (when the cache is getting full, for instance).

In any event, after a request is received, the request is examined by the cache control unit 311 and the previously-cached responses are analyzed to determine whether any of the cached responses are candidates for serving to the request. A cached response is a candidate is it is appropriate to the request. Specifically, the received URL is parsed, examined for a suitable command request, e.g., "?OpenDocument", and compared against the cached response URLS. A matching URL cached entry is analyzed by the cached-response analyzer 306 as discussed above. Specifically, the caching strategy flags which were stored along with the cached response are analyzed for applicability (via the applicability analyzer 317) and for validity (via the validity analyzer 315).

The validity analyzer 315 understands the cached response retrieval process and automatically invalidates pages based upon whether the candidate cached response is stale. However, the cacheability analyzer and attribute analyzer have shortcomings. Because of their conservative nature, they err on the side of indicating that the response is not cacheable in order to guarantee the freshness of the page returned. The cacheability analyzer configured to allow the page designer to decide that certain pages ought to be cached where the caching strategy generator, following the conventions discussed above, determines that they cannot be. The designer can utilize the following controls to override the cache behavior where appropriate. The following fields can control the use of the cache to some extent:

$CacheOptions—If the value of this field is the text string "0", then the response is not cached.

$CacheValid—The value of the numeric text string N will be evaluated and will protect the response from validity checks for N seconds.

Further, this setting can be made globally for the entire cache by setting "DominoDefaultCacheValid=N." The default for the cache is N=0. This will be discussed further below.

The $CacheValid field lets the designer to tell the cache that this response should be considered valid for a certain number of seconds regardless of what the caching strategy generator determines the cache strategy to be. Consider a simple home page that is being continually edited. The caching strategy generator would normally give this page the "Document" strategy, i.e., the Document strategy flag would be set, so that the cache entry would become invalid each time the page is edited. For example, if the homepage designer considered it acceptable that the home page not be continually updated for every request as a tradeoff for performance, the designer would then communicate this by creating a $CacheValid field on the response with a value of "N." If the designer considered it acceptable for the page to remain "fresh" for requests for, at a minimum, 3 minutes after the response was cached, the designer would set "N=180". This would cause the results of the page to be considered valid for at least 180 seconds. After that time, the normal validity checks will take place.

Figure 6:
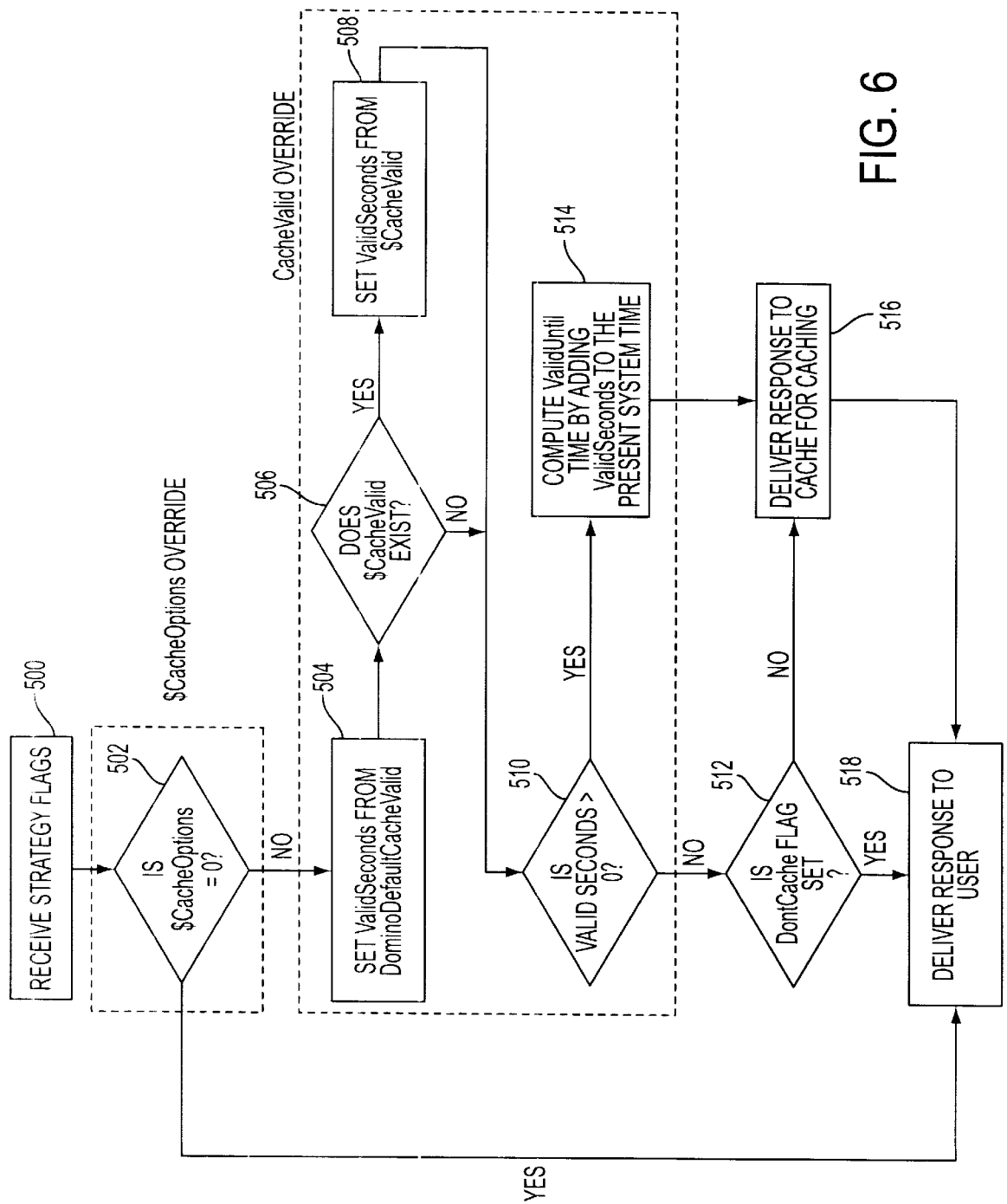
FIG. 6 illustrates a flow diagram of the method steps for implementing the caching scheme according to the present invention.

FIG. 6 is a flow chart illustrating the method implemented in the cacheability analyzer interface 320. At 500, the cacheability analyzer interface 320 receives the caching strategy flags from the caching strategy generator 322. At 502, the $CacheOptions parameter is examined. If it is equal to "0", at 518, the response is delivered to user without caching. Otherwise, at 504, the ValidSeconds parameter is set to the value of the DefaultCacheValid parameter. $CacheValid parameter is examined at 506. If the $CacheValid parameter does not exist, the method continues at 510. Otherwise, the ValidSeconds parameter is set to the value of the $CacheValid parameter at 508. At 510, the ValidSeconds parameter is examined to determine if it is greater than "0" (zero). If so, at 514, ValidUntil is computed by adding ValidSeconds to the present system time and the method continues at 516. If not, at 512, the DontCache flag is examined to determine if it is set. If not, at 516, the response is delivered to the cache for caching and the method continues at 518. If so, at 518, the response is delivered to the user.

Figure 7A:
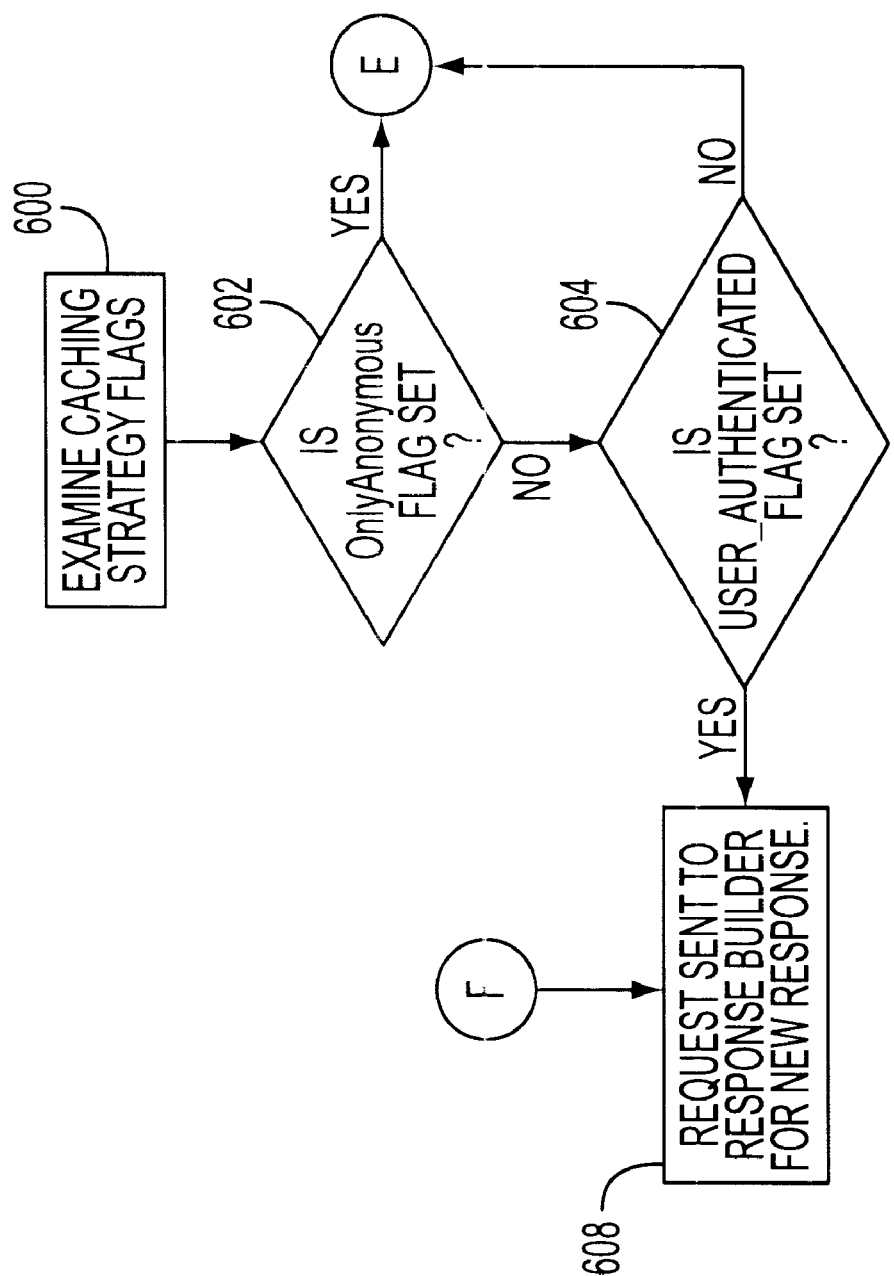
FIG. 7 (consisting of FIGS. 7a, 7b, and 7c) is a flow chart illustrating the method steps for determining the applicability and validity of a cached response.
Figure 7B:
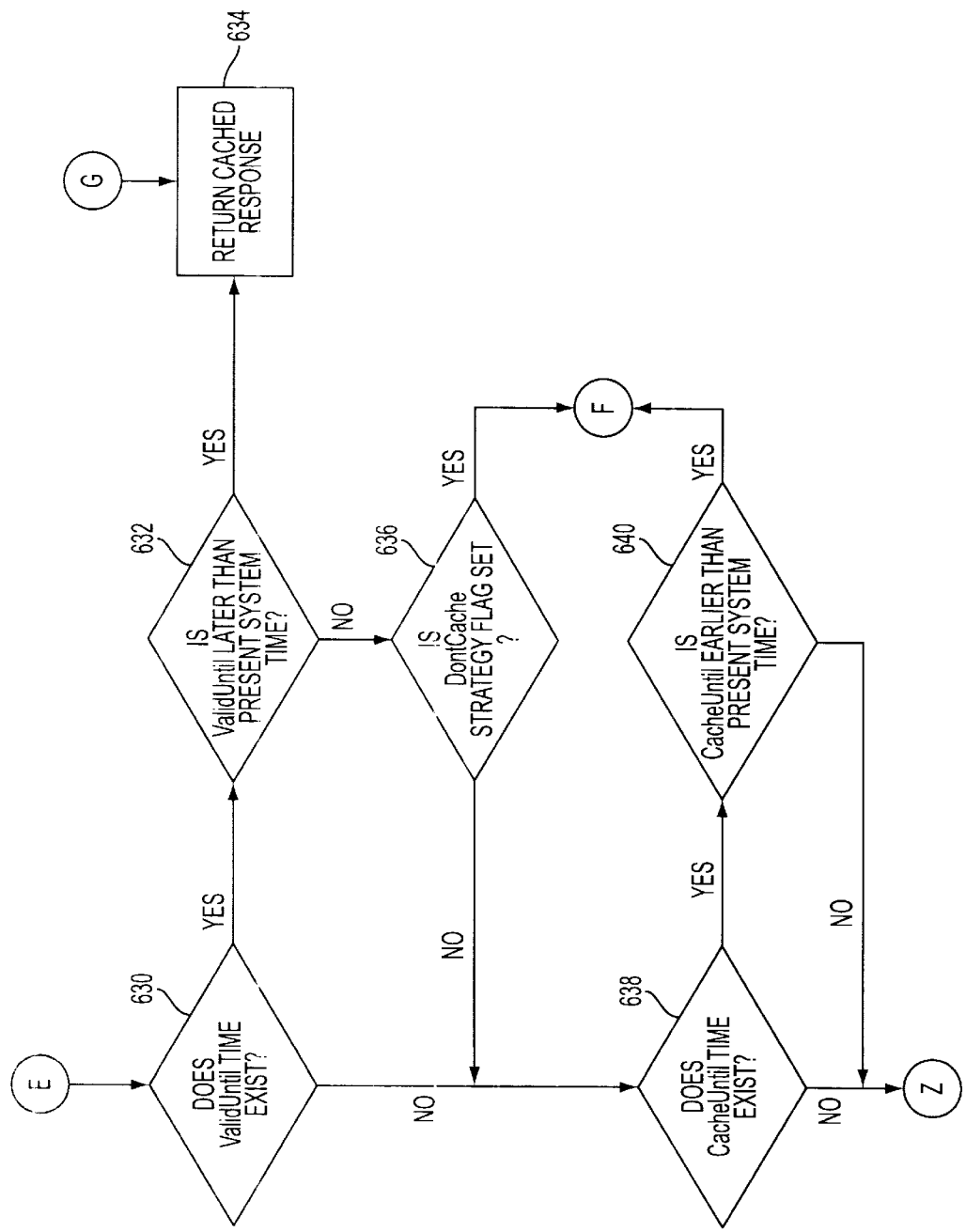
Figure 7C:
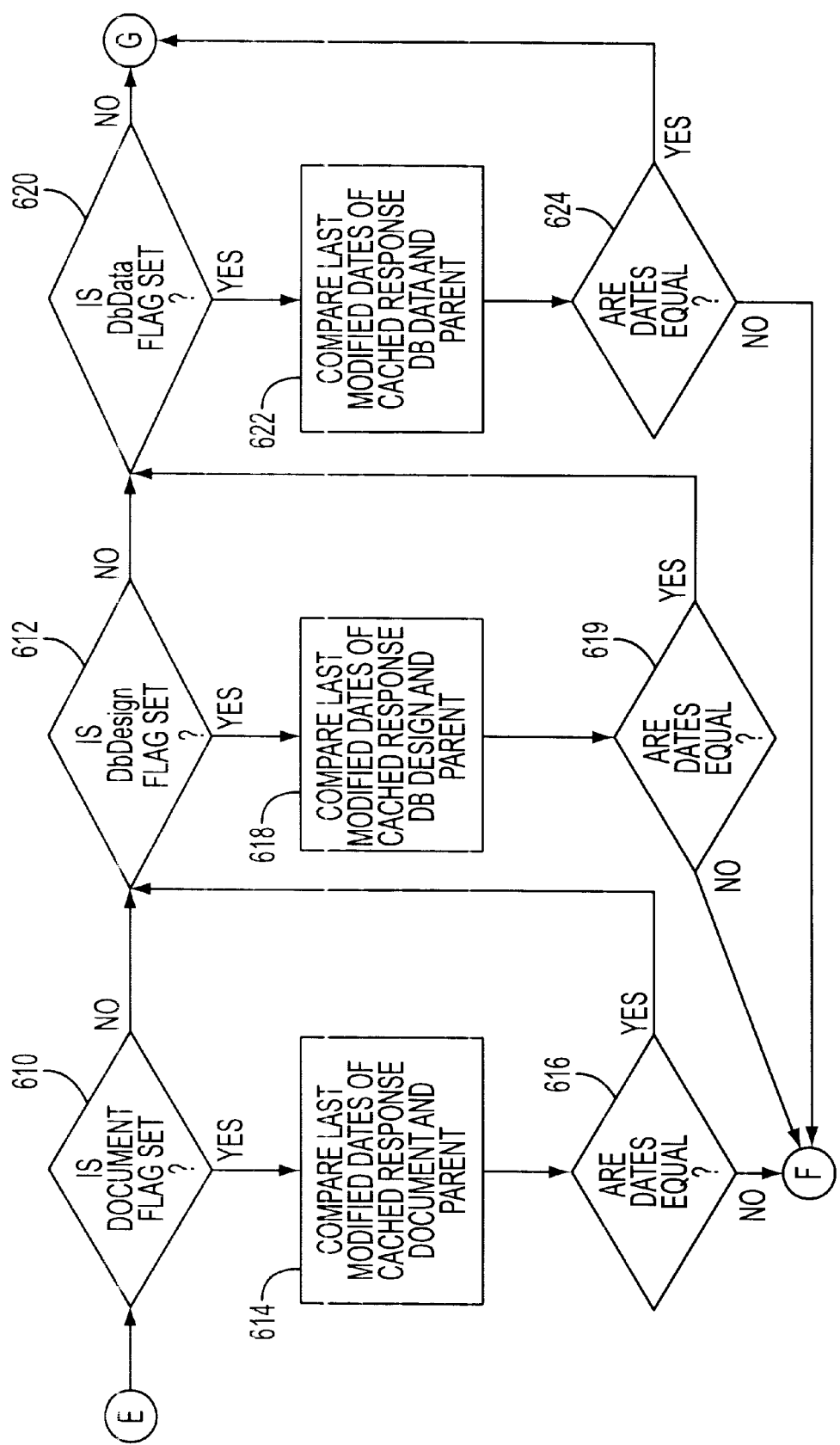

FIG. 7 is a flow chart illustrating both the applicability analysis method and the validity analysis method of a cached response. FIG. 7 consists of FIGS. 7*a*, 7*b*, and 7*c*. FIG. 7*a* lays out the applicability analysis procedure while 7*b* and 7*c* depict the procedure followed for the validity analysis. In FIG. 7*a*, at 600, the caching strategy flags are examined by the applicability analyzer 317. At 602, the OnlyAnonymous strategy flag is examined. If it is not set, the applicability procedure is successfully completed at "E", so that the validity analysis procedure may begin. If it is set, at 604, the USER_AUTHENTICATED bit for the current request is examined. If the USER_AUTHENTICATED bit is not set, the applicability procedure is successfully completed at "E", so that the validity analysis procedure may begin. If it is set, the applicability procedure is completed at 608 but has failed. After a failed completion of the applicability procedure, there is no need to continue with the validity analysis as the candidate cached response is not returned to the user. At 608, a request is made to the response builder 307 to build a new response based upon the requested URL.

The applicability analysis portion of the cached-response analysis only examined, as an example, one strategy flag (OnlyAnonymous). However, there are other request-specific characteristics that could as easily be tested. Tests for appropriate browser type and version, and tests for the appropriate language are examples of other user-specific tests that may be run against a cached response to ensure that it is applicable to the request or the requesting user.

In FIGS. 7*b* and 7*c*, the validity analysis begins at "E". At 630, the ValidUntil time is examined to determine if it exists. If not, the method continues at 638. If so, at 632, the ValidUntil time is examined to determine if it is later than the present system time. If so, at 634, the cached response is returned. If not, at 636, the DontCache flag is examined to determine if it is set. If so, the procedure continues at "F". If not, at 638, the CacheUntil time is examined to determine if it exists. If the CacheUntil time exists, at 640, the CacheUntil time is examined to determine if it is earlier than the present system time. If so, the procedure continues at "F". If not or, at 638, the CacheUntil time does not exist, the procedure continues at "Z".

In FIG. 7*c*, "Z" begins at 610. At 610, the Document strategy flag is examined. If it is not set, the procedure moves to 612. If it is set, the last modified date of the candidate cached response document is compared against the last modified date of the source document at 614. If the last modified dates are not equal, the candidate response is "stale" and the procedure moves to "F" shown on FIG. 7*a* which requests that a new response be built. If the dates are equal, at 612, the DbDesign strategy flag is examined. If it is not set, the procedure moves to 620. If it is set, the last modified date of the candidate cached response database design is compared against the last modified date of the source database design at 618. If the last modified dates are not the same at 619, the response is "stale" and the procedure moves to "F", which requests that a new response be built. If the dates are the same, at 620, the DbData strategy flag is examined. If it is not set, the procedure moves to "G" which continues at 634, discussed above. If it is set, the last modified date of the candidate cached response is compared against the last modified date of any of the data in the source database design at 622. If the last modified dates are not the same at 624, the candidate response is "stale" and the procedure moves to "F", which requests that a new response be built. If they are the same, the override check procedure begins at "G". "G" moves to 634, where the cached response is returned.

As noted above, the override parameters can be set as follows: the CacheUntil parameter (which is normally created at compute time in accordance with the part characteristics) can be overridden by the part creator; the $CacheValid can be set by the page designer on a per-page basis and, finally, the DominoDefaultCacheValid override parameter can set by the caching system designer as a default value for all responses stored in the cache.

Thus, it can be seen that the override system of the present invention allows maximum flexibility for web site design and implementation.

It should be understood, however, that use of the hypertext server may be practiced with other types of remote documents, such as word processor or spread sheet documents. Accordingly, maintenance of a database is discussed here for exemplary purposes and is not intended to limit its scope. It also should be noted that although many embodiments of the system have been discussed with reference to World Wide Web pages, the system may be practiced with various other types of documents. Moreover, although a Lotus Domino web server environment is disclosed as the preferred embodiment, it should be understood that the disclosed system may be utilized with any known web server. The above discussion of Domino and Notes was exemplary only and therefore should not be considered a limitation of the caching system.

In an alternative embodiment, the system may be implemented as a computer program product for use with a computer system. Such implementation may include a series of computer instructions fixed either on a tangible medium, such as a computer readable media (e.g., diskette 242, CD-ROM 247, ROM 215, or fixed disk 252 as shown in FIG. 2) or transmittable to a computer system, via a modem or other interface device, such as communications adapter 290 connected to the network 295 over a medium 291. Medium 291 may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable media with accompanying printed or electronic documentation (e.g., shrink wrapped software), preloaded with a computer system (e.g., on system ROM or fixed disk), or distributed from a server or electronic bulletin board over the network (e.g., the Internet or World Wide Web).

Although various exemplary embodiments of the invention have been disclosed, it will be apparent to those skilled in the art that various changes and modifications can be made that will achieve some of the advantages of the invention without departing from the true scope of the invention. These and other obvious modifications are intended to be covered by the appended claims.

Having thus described the invention, what we desire to claim and secure by Letters Patent is:

1. In a system for receiving requests from requestors and serving responses to those requests, the system having a cache for holding previously served responses for serving to subsequent requests, at least some of the responses comprising dynamic content, a cached response retrieval system for retrieving a cached response comprising:

a cache control unit having means for receiving a request and means for determining whether the cache contains a candidate cached response appropriate for that request;

a cached response analyzer for analyzing the candidate cached response, the cached response analyzer determining the validity of the candidate cached response and for determining whether the validity determination is overridden, wherein the validity of the candidate cached response is determined based on at least one of a user's identity and a location of dynamic content;

whereby the system serves the candidate cached response if the cached response analyzer determines that the candidate cached response is valid or if the validity determination is overridden.

2. The cached response analyzer of claim 1 wherein the system has a present system time/date indicating the present time and date, wherein the candidate cached response comprises a "cache until" time/date, wherein the cached response analyzer determines that the candidate cached response is invalid when the present system time/date is later than the "cache until" time/date.

3. The cached response analyzer of claim 1 wherein the system has a present system time/date indicating the present time and date, wherein the candidate cached response comprises a "valid until" parameter, wherein the cached response analyzer determines that a response cache override is set if the system time/date is earlier than "valid until" parameter.

4. The cached response analyzer of claim 3, wherein each cached response further has a last modified date, wherein the cached response analyzer determines that the cached response is invalid based upon a comparison of the candidate cached response last modified date and the last modified date of the response on the one or more sources and wherein a response cache override overrides the invalidity determination.

5. The cached response analyzer of claim 3, wherein the cache comprises a "default cache valid" parameter being set by the administrator of the server, wherein the "valid until" parameter equals the sum of the "default cache valid" parameter and the present time and date.

6. The cached response analyzer of claim 5, wherein each cached response further has a last modified date, wherein the cached response analyzer determines that the cached response is invalid based upon a comparison of the candidate cached response last modified date and the last modified date of the response on the one or more sources and wherein a response cache override overrides the invalidity determination.

7. The cached response analyzer of claim 3, wherein the response comprises a "cache valid" parameter being set by an author or designer of the content, wherein the "valid until" parameter equals the sum of the "cache valid" parameter and the present time and date.

8. For use in a system for receiving requests from requestors and serving responses to those requests, the system having a cache for holding previously served responses for serving to subsequent requests, at least some of the responses comprising dynamic content, a method for retrieving a cached response comprising the steps of:

(a) receiving a request;

(b) determining whether the cache contains a candidate cached response appropriate for that request;

(c) if so, analyzing a candidate cached response;

(d) determining whether the candidate cached response is valid, wherein the validity of the candidate cached response is determined based on at least one of a user's identity and a location of dynamic content;

(e) if so, serving the response to the request;

(f) if not, determining whether the invalidity determination is overridden;

(g) if so, serving the response to the request.

9. The method of claim 8 wherein the system has a present system time/date indicating the present time and date, wherein the candidate cached response comprises a "cache until" time/date, wherein step d comprises analyzing the "cache until" time/date against the present system time/date to determine that the candidate cached response is invalid when the present system time/date is later than the "cache until" time/date.

10. The method of claim 8 wherein the system has a present system time/date indicating the present time and date, wherein the candidate cached response comprises a "valid until" parameter, wherein step f comprises determining that the invalidity determination is overridden if the system time/date is earlier than "valid until" parameter.

11. The method of claim 10, wherein each cached response further has a last modified date, wherein step d comprises determining that the cached response is invalid based upon a comparison of the candidate cached response last modified date and the last modified date of the response on the one or more sources and wherein a response cache override overrides the invalidity determination.

12. The method of claim 10 wherein the cache comprises a "default cache valid" parameter, being set by the administrator of the server, wherein the "valid until" parameter equals the sum of the "default cache valid" parameter and the present time and date.

13. The method of claim 12, wherein each cached response further has a last modified date, wherein step d comprises determining that the cached response is invalid based upon a comparison of the candidate cached response last modified date and the last modified date of the response on the one or more sources and wherein a response cache override overrides the invalidity determination.

14. The method of claim 10, wherein the response comprises a "cache valid" parameter being set by an author or designer of the content, wherein the "valid until" parameter equals the sum of the "cache valid" parameter and the present time and date.

15. A computer usable medium for use in a computer for receiving requests from requestors and serving responses to those requests, the computer having a cache for holding previously served responses for serving to subsequent requests, at least some of the responses comprising dynamic content, the computer usable medium having computer readable program code embodied in the medium for causing the computer to perform method steps for retrieving a cached response comprising the method steps of:

(a) receiving a request;

(b) determining whether the cache contains a candidate cached response appropriate for that request;

(c) analyzing a candidate cached response;

(d) determining the validity of the candidate cached response, wherein the validity of the candidate cached response is determined based on at least one of a user's identity and a location of dynamic content; and (e) determining whether the validity determination is overridden whereby the computer serves the candidate cached response if, during step d, the candidate cached response is determined valid or the validity Determination is overridden.

16. The computer usable medium of claim 15 wherein the system has a present system time/date indicating the present time and date, wherein the candidate cached response comprises a "cache until" time/date, wherein step d comprises analyzing the "cache until" time/date against the present system time/date to determine that the candidate cached response is invalid when the present system time/date is later than the "cache until" time/date.

17. The computer usable medium of claim 15 wherein the system has a present system time/date indicating the present time and date, wherein the candidate cached response comprises a "valid until" parameter, wherein step f comprises determining that the invalidity determination is overridden if the system time/date is earlier than "valid until" parameter.

18. The computer usable medium of claim 17, wherein each cached response further has a last modified date, wherein step d comprises determining that the cached response is invalid based upon a comparison of the candidate cached response last modified date and the last modified date of the response on the one or more sources and wherein a response cache override overrides the invalidity determination.

19. The computer usable medium of claim 17 wherein the cache comprises a "default cache valid" parameter, being set by the administrator of the server, wherein the "valid until" parameter equals the sum of the "default cache valid" parameter and the present time and date.

20. The computer usable medium of claim 19, wherein each cached response further has a last modified date, wherein step d comprises determining that the cached response is invalid based upon a comparison of the candidate cached response last modified date and the last modified date of the response on the one or more sources and wherein a response cache override overrides the invalidity determination.

21. The computer usable medium of claim 17, wherein the response comprises a "cache valid" parameter being set by an author or designer of the content, wherein the "valid until" parameter equals the sum of the "cache valid" parameter and the present time and date.

22. A method for use in a system which receives a request from a requestor and serves a response to that request, the response comprising a composite of the one or more parts, at least one of the parts comprising dynamic content, the system having a cache for holding previously served cached responses, each of the cached responses having an address, the method comprising the steps of:

(a) receiving a request from a requestor;

(b) comparing the request against the cached response and for identifying a candidate cached response;

(c) determining whether the candidate cached response should be served to The request;

(d) if so, determining whether the candidate cached response was valid, wherein the validity of the candidate cached response is determined based on at least one of a user's identity and a location of dynamic content;

(e) if so, serving the candidate cached response;

(f) if not, determining whether the validity determination is overridden;

(g) if so, serving the candidate cached response;

(h) if not, building a new response to the request;

(i) analyzing the built response and determining its cacheability;

(j) caching, in the cache, the response based upon that cacheability determination; and (k) serving the built response to the request.

23. The method of claim 22 wherein the system has a present system time/date indicating the present time and date, wherein the candidate cached response comprises a "valid until" parameter, wherein step f determines that the validity determination is overridden if the system time/date is earlier than the "valid until" parameter.

24. The method of claim 23 wherein the cache comprises a "default cache valid" parameter, being set by the administrator of the server, wherein the "valid until" parameter equals the sum of the "default cache valid" parameter and the present time and date.

25. The method of claim 23, wherein the response comprises a "cache valid" parameter being set by an author or designer of the content, wherein the "valid until" parameter equals the sum of the "cache valid" parameter and the present time and date.

26. A computer usable medium for use in a computer which receives a request from a requestor and serves a response to that request, the response comprising a composite of the one or more parts, at least one of the parts comprising dynamic content, the computer having a cache for holding previously served cached responses, each of the cached responses having an address, the computer usable medium having computer readable program code embodied in the medium for causing the computer to perform method steps of:

(a) receiving a request from a requestor;

(b) comparing the request against the cached response and for identifying a candidate cached response;

(c) determining whether the candidate cached response should be served to the request;

(d) if so, determining whether the candidate cached response was valid, wherein the validity of the candidate cached response is determined based on at least one of a user's identity and a location of dynamic content;

(e) if so, serving the candidate cached response;

(f) if not, determining whether the validity determination is overridden;

(g) if so, serving the candidate cached response;

(h) if not, building a new response to the request;

(i) analyzing the built response and determining its cacheability;

(j) caching, in the cache, the response based upon that cacheability determination; and (k) serving the built response to the request.

27. The computer usable medium of claim 26 wherein the system has a present system time/date indicating the present time and date, wherein the candidate cached response comprises a "valid until" parameter, wherein step f determines that the validity determination is overridden if the system time/date is earlier than the "valid until" parameter.

28. The computer usable medium of claim 27 wherein the cache comprises a "default cache valid" parameter, being set by the administrator of the server, wherein the "valid until" parameter equals the sum of the "default cache valid" parameter and the present time and date.

29. The computer usable medium of claim 27, wherein the response comprises a "cache valid" parameter being set by an author or designer of the content, wherein the "valid until" parameter equals the sum of the "cache valid" parameter and the present time and date.

* * * * *